United States Patent [19]
Butler, Jr.

[11] Patent Number: 5,944,635
[45] Date of Patent: Aug. 31, 1999

[54] SAFETY SHUTDOWN AND LATCH OFF

[75] Inventor: James R. Butler, Jr., Peters, Mo.

[73] Assignee: Digital Concepts of Missouri, Inc., Earth City, Mo.

[21] Appl. No.: 09/014,477

[22] Filed: Jan. 28, 1998

[51] Int. Cl.$^6$ .................................................. A63B 22/02
[52] U.S. Cl. ............................... 482/54; 482/7; 482/901; 482/903
[58] Field of Search ............................... 482/1–9, 51, 54, 482/52, 74, 900–903; 198/570, 577, 794

[56] References Cited

U.S. PATENT DOCUMENTS

| | | |
|---|---|---|
| 3,510,744 | 5/1970 | Callan . |
| 4,084,119 | 4/1978 | Kato et al. . |
| 4,126,889 | 11/1978 | Ibamoto et al. . |
| 4,196,462 | 4/1980 | Pohl . |
| 4,364,556 | 12/1982 | Otte . |
| 4,524,309 | 6/1985 | Hisatake et al. . |
| 4,679,112 | 7/1987 | Craig . |
| 4,749,181 | 6/1988 | Pittaway et al. ........................ 482/54 |
| 4,910,447 | 3/1990 | Masters . |
| 5,061,884 | 10/1991 | Saganovsky . |
| 5,127,085 | 6/1992 | Becker et al. . |
| 5,141,479 | 8/1992 | Vanjani et al. .......................... 482/54 |
| 5,235,259 | 8/1993 | Dhindsa et al. . |
| 5,410,229 | 4/1995 | Sebastian et al. . |
| 5,489,250 | 2/1996 | Densmore et al. ...................... 482/54 |
| 5,545,112 | 8/1996 | Densmore et al. ...................... 482/54 |
| 5,568,025 | 10/1996 | Sumida et al. . |
| 5,571,062 | 11/1996 | Saganovsky . |
| 5,643,142 | 7/1997 | Salerno et al. . |

Primary Examiner—Glenn E. Richman
Attorney, Agent, or Firm—Senniger, Powers, Leavitt & Roedel

[57] ABSTRACT

A motorized exercise apparatus energized by a power source. An electronically commutated motor drives the exercise apparatus. A commutation switch selectively connects the power source to the motor and conducts a switch current when the power supply is connected to the motor. A safety shutdown switch responds to a safety shutdown signal. The safety shutdown switch has a first mode wherein the power source is connected to the motor, and a second mode wherein the power source is disconnected from the motor. A threshold circuit associated with the commutation switch generates a switch current signal representative of switch current. The threshold circuit comprises a threshold detector responsive to the switch current signal for generating the safety shutdown signal and placing and maintaining the safety shutdown switch in the second mode when the switch current signal indicates the switch current is above a threshold.

24 Claims, 3 Drawing Sheets

SAFETY SHUTDOWN AND LATCH OFF

BACKGROUND OF THE INVENTION

Motor driven exercise machines, such as treadmills, have become increasingly popular in recent years. With this popularity, the complexity of such devices has also increased. For example, many treadmills include speed and incline control. One effective way to employ speed control is to use electronically commutated motors. Such motors typically use one or more high power solid state switches to selectively connect a power source to the motor. This selective application, commonly referred to as "commutation," can accurately control the speed of the motor, and hence, the speed of the treadmill.

Of course, safety is also of concern to those who either use or manufacture and sell motorized exercise machines. Safety in this sense includes both the safety of the user as well as safety of the electrical and mechanical components that comprise the machine. For example, in treadmills using a solid state power switch to commutate power to the motor, it is important to account for the possibility that such a switch might fail—if the commutation switch fails in a short circuit state, full power is applied to the motor. Such a condition could result in overspeeding the treadmill as well as damaging the apparatus. Therefore, many motorized treadmills include shutdown means for removing power when such conditions are detected.

Several methods for accomplishing this safety shutdown function have been devised. For example, inline fuses can be installed that "blow" upon prolonged overcurrent conditions. Such an approach is employed in the treadmill safety module depicted in U.S. Pat. No. 5,571,062. This approach, while partially effective, has several drawbacks. First, if "slow blow" fuses are used, shutdown is delayed. This can result in potential risk to both the user and the components of the machine. For example, the motor may burn up or otherwise sustain damage. Second, if "fast blow" fuses are used, spurious undesirable shutdowns might occur due to transients. This latter problem is compounded by the fact that the user must then replace the blown fuse, and if the problem was more serious than a mere transient, the replacement fuse will also blow. Thus, it may take the failure of two fuses before the treadmill user can determine that the machine has experienced a serious failure.

Another method for detecting failures measures the voltage drop that develops naturally between the motor and the commutation switch. In particular, connecting the commutation switch between the motor and ground creates a voltage divider comprising the motor impedance and the short circuit switch impedance. The voltage developed at a point between the switch and the motor is monitored. If the switch fails in a short circuit state, that voltage will approach ground potential. One drawback of this latter approach, however, is that it is not as effective if used with low impedance motors that are available. Such differences in impedance can occur, for example, due to the use of different wire gauges. If a low impedance motor is used, the motor itself does not provide much inherent current limiting. Therefore, more current flows through the shorted switch causing a relatively higher voltage to develop across the switch. This relatively higher voltage may provide a false indication that the switch is operating correctly. As the motor speed increases the impedance of the motor also increases, and, eventually, the shutdown can occur. This delay is not optimal. Hence, the safety shutdown circuit must be designed to account for the impedance of the motor installed and a "generic" circuit is not likely to work as effectively.

There is a need, therefore, for a low cost, highly reliable, and motor impedance independent safety shutdown circuit for use in motorized exercise machines.

SUMMARY OF THE INVENTION

It is an object of the invention to provide a motorized exercise apparatus with a low cost safety shutdown capability. It is another an object of the invention to provide a motorized exercise apparatus with a low cost safety shutdown capability for use with an electronically commutated motor. It is yet another object of the invention to provide a motorized exercise apparatus in which the safety shutdown circuit functions independently of the impedance of the motor installed and senses current flowing through a commutation control switch. It is still another object of the invention to provide a motorized exercise apparatus in which an improved safety shutdown circuit may be implemented without unnecessary redesign of existing circuitry. It is yet another object of the invention to provide a motorized exercise apparatus in which power is latched off when an overcurrent condition is sensed. It is a further object of the invention to provide a motorized exercise apparatus in which power is latched off when the motor is not installed. It still another object of the invention to provide a motorized exercise apparatus with a safety shutdown capability that is transient resistant.

It is another object of the invention to provide a low cost, highly reliable safety shutdown and latch off circuit for use in a motorized exercise apparatus. It is yet another object of the invention to provide a safety shutdown and latch off circuit for use in a motorized exercise apparatus that functions independently of motor impedance. It is a further object of the invention to provide a safety shutdown and latch off circuit for use in a motorized exercise apparatus that requires no redesign of existing circuitry. It is yet another object of the invention to provide a safety shutdown and latch off circuit for use in a motorized exercise apparatus in which a shutdown signal is asserted when an overcurrent condition is sensed. It is still another object of the invention to provide a transient resistant safety shutdown and latch off circuit for use in a motorized exercise apparatus.

The invention comprises a motorized exercise apparatus for use with a power source. An electronically commutated motor drives the exercise apparatus. A commutation switch selectively connects the power source to the motor and conducts a switch current when the power supply is connected to the motor. A safety shutdown switch responds to a safety shutdown signal. The safety shutdown switch has a first mode wherein the power source is connected to the motor, and a second mode wherein the power source is disconnected from the motor. A threshold circuit associated with the commutation switch generates a switch current signal representative of switch current. The threshold circuit comprises a threshold detector responsive to the switch current signal for generating the safety shutdown signal and placing and maintaining the safety shutdown switch in the second mode when the switch current signal indicates the switch current is above a threshold.

The invention also comprises a safety shutdown circuit and latch off for a motorized exercise apparatus that has a power source, an electronically commutated motor, and a commutation switch having a switch current. The safety shutdown circuit comprises a safety shutdown switch responsive to a safety shutdown signal. The latching switch has a first mode wherein the power source is connected to the motor and a second mode wherein the power source is disconnected from the motor. A threshold circuit associated with the commutation switch that generates a switch current signal representative of switch current. The threshold circuit comprises a threshold detector responsive to the switch current signal for generating the safety shutdown signal and placing and maintaining the safety shutdown switch in the second mode when the switch current signal indicates that the switch current is above a threshold.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
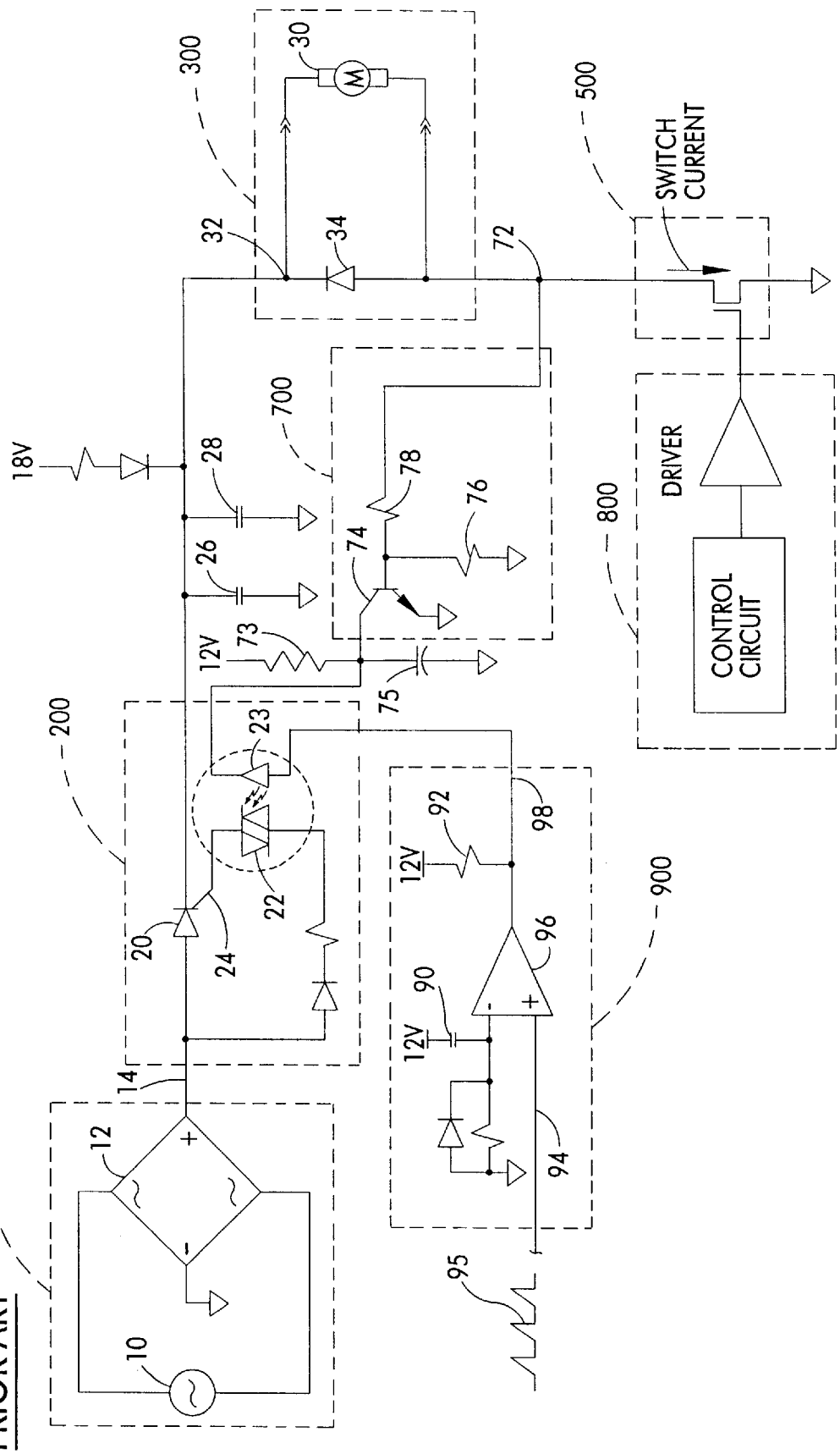
FIG. 1 is a schematic diagram of a prior art safety shutdown circuit for use in a motorized exercise apparatus.

Referring now to FIG. 1, a schematic reflective of a prior art overcurrent detection and safety shutdown circuit is illustrated. An input power source 10 is passed through a rectifier 12 to provide a rectified power source 14 to a safety shutdown circuit 200. Safety shutdown circuit 200 comprises a series input switch 20 and an opto-isolated triac 22. In the particular embodiment shown, the series input switch 20 is a thyristor or silicon controlled rectifier ("SCR") with its anode connected to the rectified power source 14, its cathode connected to a motor connection 32, and its gate controlled by an opto-isolated triac 22. Those skilled in the art will recognize that there are many different types of thyristors, SCRs, and safety shutdown circuits. The SCR employed in this circuit 200 is a normally open circuit device. When a gate signal 24 is applied to the gate of series input switch 20, the SCR conducts in the forward direction. Once the series input switch 20 is conducting, it takes two actions to turn off the switch: (1) the gate signal 24 must be removed and (2) current through series input switch 20 must go to zero. Thus, when gate signal 24 is removed and rectified power input 14 goes reaches zero, series input switch open circuits and power is removed from the motor.

A soft start circuit 900 controls the gating of the series input switch 20 by controlling opto-isolated triac 22. Upon initial power up of the exercise apparatus, a control waveform (e.g., sawtooth 95) is applied on a positive input lead 94 of a comparator 96. Simultaneously, a capacitor 90 begins to charge down such that the voltage appearing at the negative input of comparator 96 decreases from 12 VDC to 0 VDC as capacitor 90 charges. Comparator 96 outputs a gate control signal 98 which is connected to 12 VDC via a pull up resistor 92. By this arrangement, during initialization the gate control signal 98 comprises a series of successively longer pulses such that the series input switch 20 is conducting for successively longer portions of each input power cycle of rectified power source 14. This results in control of the in rush current applied to a pair of capacitors 26 and 28. As a result, power to the motor is commutated by the series input switch 20 during this initialization/soft start phase. After several soft start cycles, capacitor 90 will charge down such that 0 VDC is present at the negative input of comparator 96 resulting in the steady application of gate control signal 98.

Gate control signal 98 is connected to the anode of an LED 23 which controls the operation of opto-isolated triac 22. The cathode of LED 23 is connected to ground via a motor installed switch 700. Hence, when gate control signal 98 is positive (asserted) and motor installed switch 700 is closed, current flows through LED 23. Current flow through LED 23 illuminates and turns on triac 22 causing gate signal 24 to be applied to switch 20 thereby closing series input switch 20 so that power is available to motor 30.

In the prior art embodiment of FIG. 1, motor installed switch 700 performs two functions. First, if the electronically commutated motor 30 is not installed, a diode 34 acts as an open circuit and no voltage appears at the base of a transistor 74. Therefore, the motor installed switch 700 will be open. In the open condition, no current can flow through LED 23, and as a result, the series input switch 20 will not be turned on. In other words, the rectified power source 14 can not be applied if motor 30 is not installed. Second, motor installed switch 700 also performs an overcurrent monitoring function; motor installed switch 700 monitors excess current flow (overcurrent) through a commutation switch 500. Such excess current may occur, for example, if commutation switch 500 fails in a short circuit state. In the embodiment depicted in FIG. 1, commutation switch 500 comprises a high power MOSFET; however, other solid state power switches such as IGBTs may also be employed. If the commutation switch 500 short circuits, the voltage appearing at a node 72 will approach ground potential. This potential is sensed at the base of transistor 74 via a voltage divider comprising resistors 76 and 78. A ground potential at the base of transistor 74 causes transistor 74 to shut off (not conduct) thereby removing the gate control signal 98 from triac 22 and causing the series input switch 20 to open circuit and latch off rectified power supply 14.

One drawback of this prior art approach, however, is that the excess current detection capability of the motor installed switch 700 depends heavily upon the impedance of motor 30. For example, electronically commutated motors may typically have a relatively high impedance, at least as compared to the short circuit impedance of switches such as commutation control switch 500. If, however, the motor 30 has a relatively low impedance, shutdown is not as reliable. In particular, if motor 30 has a very low impedance and the commutation switch 700 short circuits, the motor installed switch 700 stays on until the speed of motor 30 reaches a sufficiently high value. This is due to the fact that the relatively low motor impedance results in less inherent current limiting. If the impedance of motor 30 is, for example, less than the short circuit impedance of switch 500, then the voltage divider created by the two impedances results in a higher voltage appearing at node 72 than would be the case if the with relatively large motor impedances. If the voltage appearing at node 72 is too high, transistor 74 remains "on" and motor installed switch 700 will not recognize the overcurrent condition. This is undesirable; therefore, the components that comprise motor installed switch 700 must be matched with the particular motor used—a generic circuit may not work with both low and high impedance motors.

In treadmills using the circuit of FIG. 1 employing a 2N6427 darlington pair for transistor 74 and resistors 51 KΩ and 150 KΩ for resistors 76 and 78, the motor installed switch 700 will immediately recognize an overcurrent condition of 2.5 Hp motor such as a Pacific Scientific 2.5 Hp DC Permanent Magnet Motor (PMM) having a running resistance of 0.816 whereas switch 700 will not immediately recognize an overcurrent condition of a 3.0 Hp motor such as Lesson 3.0 Hp DC PMM having a running resistance of 0.642 Ω. This is due, in part, to the use of relatively larger wire in the windings of the 3 horsepower motors.

Figure 2:
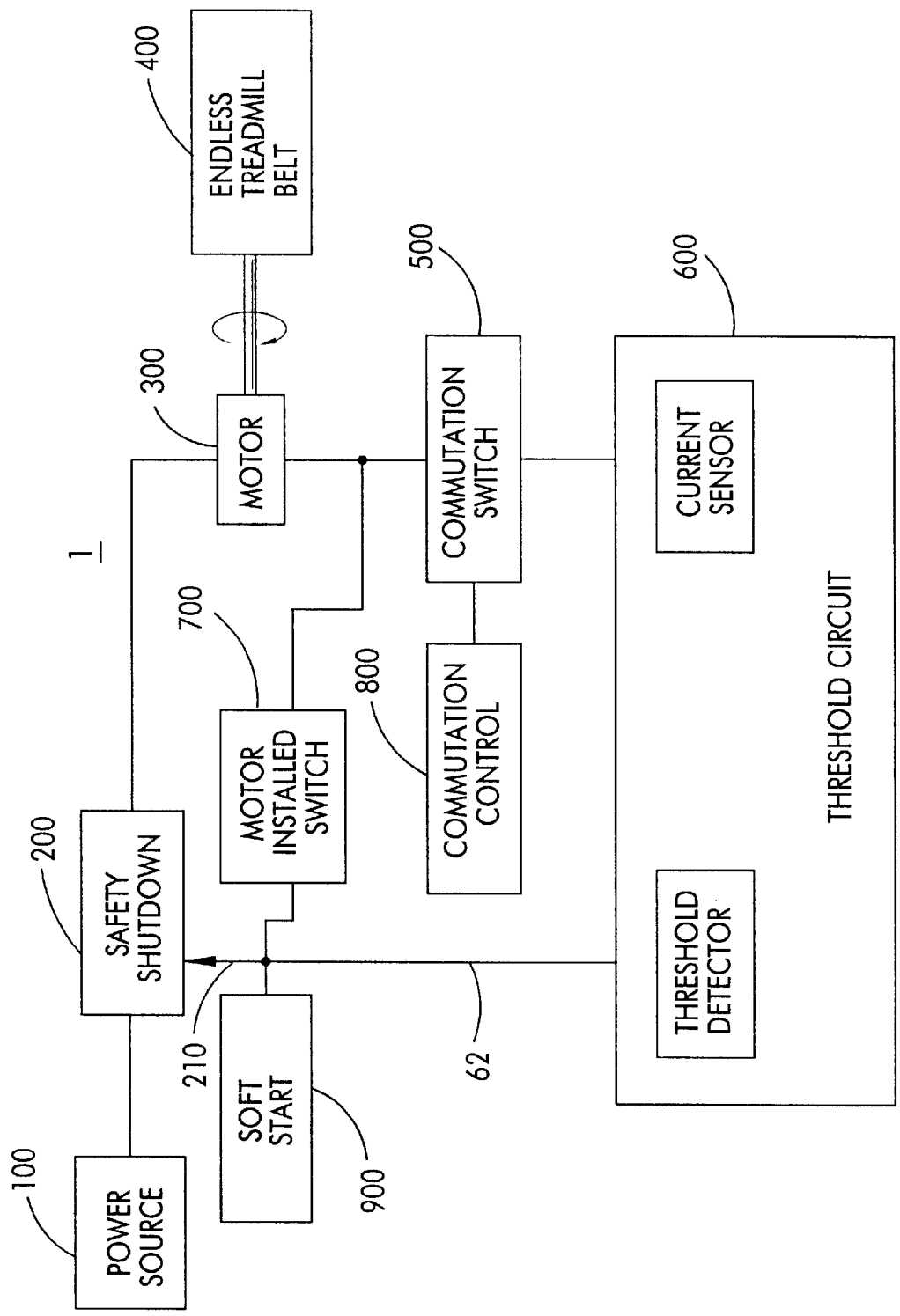
FIG. 2 is a is a block diagram of one preferred embodiment of a motorized exercise apparatus of the invention including a safety shutdown circuit.

FIG. 2 is a block diagram of one possible embodiment of the exercise apparatus 1 of the present invention wherein corresponding reference characters are used for like components. Power source 100 is connected to safety shutdown switch 200. Safety shutdown switch 200 has two modes. In one mode, switch 200 is nonconducting such that power source 100 is latched off from motor 300. In another mode, safety shutdown switch 200 conducts such that power source 100 is connected to motor 300.

Safety shutdown switch 200 comprises a normally open circuit (non-conducting) switching circuit. In the block diagram shown, safety shutdown switch 200 has a control terminal 210. The switching circuit conducts in the second mode and if three conditions are present. First, soft start circuit 900 must supply an input gating signal to the control terminal 210 of switch 200. Second, the motor installed switch 700 must provide an indication at control terminal 210 that a motor 300 is properly installed. Finally, a threshold circuit 600 must not indicate that the current sensed through commutation switch 500 exceeds a threshold value.

Advantageously, in the exercise apparatus as depicted in FIG. 2, the motor installed switch 700 is no longer required to perform two functions as in the FIG. 1 prior art embodiment, and, as such, need not be tailored to accommodate different motor impedances. Separate current sensing and threshold detection circuitry 600 performs the excess current function independent of motor impedance, thereby ensuring a faster and more reliable shut down. For example, when safety shutdown switch 200 is conducting, power is applied to motor 300 thereby driving motorized exercise apparatus 400. In the embodiment shown, motor 300 is depicted as driving an endless treadmill belt of the apparatus 1. However, the present invention may be used with any motorized exercise apparatus other than a treadmill. Commutation control circuit 800 selectively opens and closes commutation switch 500 thereby allowing switch current to flow and commutating the power applied to motor 300. This commutation effectively controls the speed of the apparatus 400. As will be apparent to those skilled in the art, commutation control 800 can take many forms and is not described further here. Threshold circuit 600 monitors the switch current through commutation switch 500. If commutation switch 500 fails in a short circuit condition, threshold circuit 600 detects the excess current and generates a switch current signal representative of the current through commutation switch 500. In particular, if the switch current signal exceeds a threshold, the threshold circuit generates a safety shutdown signal 62. When safety shutdown signal 62 is asserted, safety shutdown switch 200 open circuits and the power source 100 is latched off from the motor 300. Power must by cycled (i.e., deenergized and reenergized) in order to reset this latching feature. If, after power is cycled, the short circuit condition still exists, the safety shutdown signal 62 will again be asserted so that power source 100 will not be applied to the motor 300, thus ensuring safe operation of the exercise apparatus.

Figure 3:
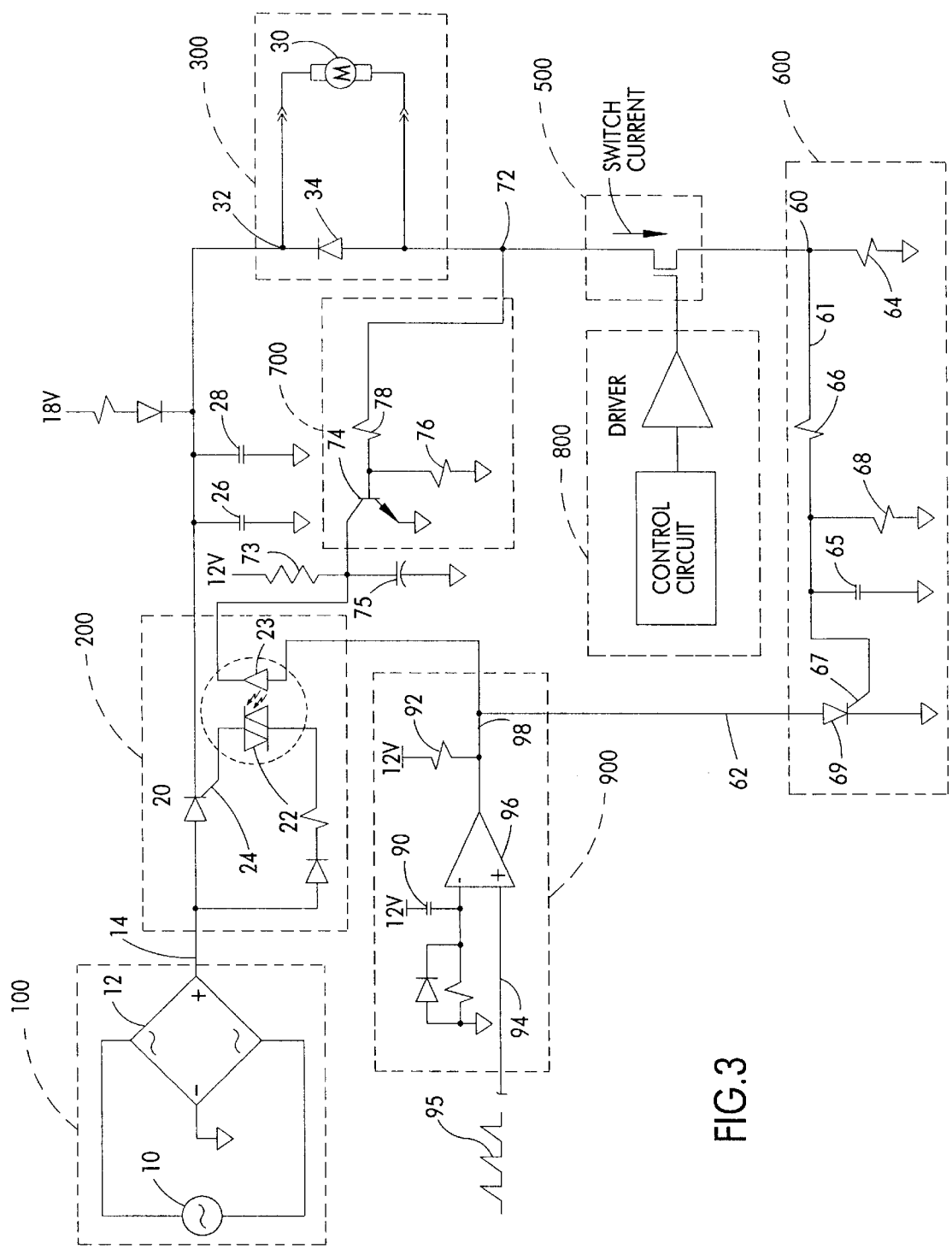
FIG. 3 is a schematic diagram of one preferred embodiment a safety shutdown circuit according to the invention for use in a motorized exercise apparatus.

Turning now to FIG. 3, a detailed schematic of the circuitry of the present invention. Note that common reference characters have been maintained between FIGS. 1 through 3 where applicable. The general operation of the exercise apparatus depicted in FIG. 3 is similar to the apparatus shown in FIG. 1. The primary difference is the addition of the highly reliable, and motor impedance independent, threshold detection and shutdown circuit 600. Moreover, in the embodiment of FIG. 3, motor installed switch 700 is no longer required to perform the overcurrent function that it performed in the prior art circuit as shown in FIG. 1 above.

In normal operation, soft start circuit 900 selectively applies a gate control signal 98 to LED 23 of opto-isolated triac 22. Opto-isolated triac 22 controls the application of the gate signal to series input switch 20. When gate signal 24 is applied, series input switch closes and conducts. Once the soft start period is complete, the gate control signal 98 is essentially constant and series input switch 20 remains closed (conducting). Current through commutation switch 500 is sensed at two points. First, current is sensed at node 72. As was the case in the prior art circuit FIG. 1, the current sensed at node 72 provides an indication as to whether motor 30 is installed. Second, as shown in FIG. 3, switch current is also sensed at node 60 via a relatively low value current sensing resistor 64 (e.g., 0.024 Ω, 5 W). Most of the current flowing through commutation switch 500 will flow to ground through current sensing resistor 64 causing a voltage to develop across resistor 64. The voltage across resistor 64 is reflected as a switch current signal 61 and is directly proportional to the current flowing through commutation switch 500. Switch current signal 61 is reduced through a voltage divider circuit comprising resistors 66 and 68 to provide a threshold detector gate signal 67 for a threshold detector switch 69.

In the embodiment shown in FIG. 3, threshold detector switch 69 comprises an SCR (thyristor) that is normally open circuit (non-conducting). Hence, under normal operating conditions (commutation switch functioning properly) threshold detector 69 is open and the threshold circuit 600 is disconnected from the gate control signal 98. If, however, commutation switch 500 fails in a short circuit condition, the excess current is sensed via current sensing resistor 64 and the switch current signal 61 will exceed the threshold determined by resistors 66 and 68, thus causing a threshold detector gate signal 67 to be applied to threshold detector switch 69. When threshold detector gate signal 67 is applied, threshold detector switch 69 closes (conducts) thereby connecting a safety shutdown signal 62 to ground potential. This, in turn, causes a ground to appear on gate control signal 98 thereby depriving LED 23 of current and turning off triac 22. When triac 22 is off, no signal is available to turn on series input switch 20. Therefore, series input switch 20 is shut off the next time the rectified power supply 14 reaches 0 VDC. In other words, once an overcurrent condition is sensed at node 60, it only takes approximately one half-wave cycle time to shut off power from motor 30.

A filter is provided in the threshold circuit 600 to ensure that the threshold detector switch 69 is not activated due to the normal commutation of switch 500. In FIG. 3, for example, a capacitor 65 is connected between threshold detector gate input 67 and ground. Capacitor 65 is sized according to the desired commutation scheme. In the embodiment depicted in FIG. 3, for example, capacitor 65 is 0.1 μF; resistors 66 and 68 are 2 KΩ and 20 KΩ respectively.

In the embodiment shown, threshold detector switch 69 is an SCR—a normally non-conducting device. Because switch 69 is an SCR, after threshold detector switch 69 is gated on and conducting, removal of the gate signal 67 does not cause switch 69 to open circuit. Once conducting, threshold detector switch 69 will only open circuit upon removal of both the gate signal 67 and current through the device. While power is applied to the apparatus, current is maintained through threshold detector switch 69 via the 12 VDC source that is connected to the anode of threshold detector 69 through resistor 92. Hence, once threshold detector 69 closes (conducts), power must be removed from the system in order to open circuit threshold detector 69. In this way, once an overcurrent is detected, rectified power supply 14 is latched off (not applied) to the motor 30 and cannot be reapplied unless power to the entire apparatus is cycled (deenergized and reenergized).

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A motorized exercise apparatus for use with a power source comprising:

an exercise apparatus;

an electronically commutated motor for driving the exercise apparatus;

a commutation switch for selectively connecting the power source to the motor and conducting a switch current when the power supply is connected to the motor;

a safety shutdown switch responsive to a safety shutdown signal, said safety shutdown switch having a first mode wherein the power source is connected to the motor and a second mode wherein the power source is disconnected from the motor; and a threshold circuit associated with the commutation switch for generating a switch current signal representative of switch current, said threshold circuit comprising a threshold detector responsive to the switch current signal for generating the safety shutdown signal and placing and maintaining the safety shutdown switch in the second mode when the switch current signal indicates the switch current is above a threshold.

2. The motorized exercise apparatus of claim 1 wherein the commutation switch comprises an IGBT or a MOSFET.

3. The motorized exercise apparatus of claim 1 wherein the threshold circuit further comprises a current sensing resistor connected to the commutation switch for generating the switch current signal.

4. The motorized exercise apparatus of claim 3 further comprising a filter connected to the current sensing resistor for filtering out transients in the switch current signal.

5. The motorized exercise apparatus of claim 1 wherein the safety shutdown switch comprises a thyristor.

6. The motorized exercise apparatus of claim 5 wherein the thyristor comprises a series switch between the power source and the motor.

7. The motorized exercise apparatus of claim 1 wherein the threshold detector provides an open circuit when the switch current is below the threshold and maintains a ground after the switch current is at or above the threshold until the power source is deenergized.

8. The motorized exercise apparatus of claim 1 wherein the threshold circuit removes the safety shutdown signal when the safety shutdown switch is in the second mode and the power source is disconnected and reconnected to the exercise apparatus thereby causing the safety shutdown switch to change from the second mode to the first mode.

9. The motorized exercise apparatus of claim 1 wherein the safety shutdown switch is in series with the motor for selectively open-circuiting the motor and has a control terminal controlling its operation, and wherein the threshold detector comprises a first switch responsive to the switch current signal for selectively inhibiting closing of the safety shutdown switch when the safety shutdown switch is in an open circuit condition in the second mode.

10. The motorized exercise apparatus of claim 9 wherein when the safety shutdown switch is in the second mode, the safety shutdown signal is removed when the power source is deenergized.

11. The motorized exercise apparatus of claim 1 further comprising a motor installed switch for latching off the safety shutdown switch when the commutation switch is shorted while the motor is running and the motor impedance is high, and said motor installed switch not latching off the safety shutdown switch when the commutation switch is shorted while the motor is running and the motor impedance is low.

12. The motorized exercise apparatus of claim 1 further comprising a soft start circuit for selectively controlling application of a control signal to the safety shutdown switch during an initialization period, said control signal causing the safety shutdown switch to commutate power applied to the motor during the initialization period.

13. A safety shutdown circuit and latch off for a motorized exercise apparatus having a power source, an electronically commutated motor, and a commutation switch having a switch current, the safety shutdown circuit comprising:

a safety shutdown switch responsive to a safety shutdown signal, said safety shutdown switch having a first mode wherein the power source is connected to the motor and a second mode wherein the power source is disconnected from the motor; and a threshold circuit associated with the commutation switch for generating a switch current signal representative of switch current, said threshold circuit comprising a threshold detector responsive to the switch current signal for generating the safety shutdown signal and placing and maintaining the safety shutdown switch in the second mode when the switch current signal indicates the switch current is above a threshold.

14. The safety shutdown circuit of claim 13 wherein the commutation switch comprises an IGBT or a MOSFET.

15. The safety shutdown circuit of claim 13 wherein the threshold circuit further comprises a current sensing resistor connected to the commutation switch for generating the switch current signal.

16. The safety shutdown circuit of claim 15 further comprising a filter connected to the current sensing resistor for filtering out transients in the switch current signal.

17. The safety shutdown circuit of claim 13 wherein the safety shutdown switch comprises a thyristor.

18. The safety shutdown circuit of claim 17 wherein the thyristor comprises a series switch between the power source and the motor.

19. The safety shutdown circuit of claim 13 wherein the threshold detector provides an open circuit when the switch current is below the threshold and maintains a ground after the switch current is at or above the threshold until the power source is deenergized.

20. The safety shutdown circuit of claim 13 wherein the threshold circuit removes the safety shutdown signal when the safety shutdown switch is in the second mode and the power source is disconnected and reconnected to the exercise apparatus thereby causing the safety shutdown switch to change from the second mode to the first mode.

21. The safety shutdown circuit of claim 13 wherein the safety shutdown switch is in series with the motor for selectively open-circuiting the motor and has a control terminal controlling its operation, and wherein the threshold detector comprises a first switch responsive to the switch current signal for selectively inhibiting closing of the safety shutdown switch in an open circuit condition in the second mode.

22. The safety shutdown circuit of claim 21 wherein when the safety shutdown switch is in the second mode, the safety shutdown signal is removed when the power source is deenergized.

23. The safety shutdown circuit of claim 13 further comprising a motor installed switch for latching off the safety shutdown switch when the commutation switch is shorted while the motor is running and the motor impedance is high, and said motor installed switch not latching off the safety shutdown switch when the commutation switch is shorted while the motor is running and the motor impedance is low.

24. The safety shutdown circuit of claim 13 further comprising a soft start circuit for selectively controlling application of a control signal to the safety shutdown switch during an initialization period, said control signal causing the safety shutdown switch to commutate power applied to the motor during the initialization period.

\* \* \* \* \*